US012600478B2

(12) United States Patent (10) Patent No.: US 12,600,478 B2
Veneruso (45) Date of Patent: Apr. 14, 2026

(54) RECLINING SEAT

(71) Applicant: GEVEN S.P.A., Nola (IT)

(72) Inventor: Alberto Veneruso, Nola (IT)

(73) Assignee: GEVEN S.P.A., Nola (IT)

( * ) Notice: Subject to any disclaimer, the term of this patent is extended or adjusted under 35 U.S.C. 154(b) by 242 days.

(21) Appl. No.: 18/208,501

(22) Filed: Jun. 12, 2023

(65) Prior Publication Data

US 2024/0150022 A1 May 9, 2024

(30) Foreign Application Priority Data

Jun. 13, 2022 (IT) ........................ 102022000012446

(51) Int. Cl.
B64D 11/06 (2006.01)
(52) U.S. Cl.
CPC .................................. B64D 11/064 (2014.12)
(58) Field of Classification Search
CPC .................................................... B64D 11/064
See application file for complete search history.

(56) References Cited

U.S. PATENT DOCUMENTS

| | | | | | |
|---|---|---|---|---|---|
| 4,004,836 | A | * | 1/1977 | Kristensson | ............ A61G 5/006 |
| | | | | | 297/301.2 |
| 5,779,312 | A | * | 7/1998 | Nagai | .................... B60N 2/231 |
| | | | | | 297/362.13 |
| 6,644,738 | B2 | * | 11/2003 | Williamson | ....... B64D 11/0638 |
| | | | | | 297/216.2 |

| | | | | | |
|---|---|---|---|---|---|
| 6,688,694 | B1 | * | 2/2004 | Yu | ........................... A47C 1/026 |
| | | | | | 297/354.13 |
| 7,182,402 | B1 | * | 2/2007 | Ahad | ................... B64D 11/064 |
| | | | | | 297/354.12 |
| 7,726,607 | B2 | * | 6/2010 | Schumacher | ............ B60N 2/22 |
| | | | | | 297/335 |
| 7,866,752 | B1 | | 1/2011 | Heuser et al. | |
| 9,764,844 | B2 | * | 9/2017 | Le | ...................... B64D 11/0647 |
| 10,144,515 | B2 | * | 12/2018 | Le | ............................ B60N 2/85 |
| 2004/0051363 | A1 | | 3/2004 | Wagner et al. | |
| 2008/0169694 | A1 | * | 7/2008 | Speh | .................... B64D 11/064 |
| | | | | | 297/300.1 |
| 2011/0148167 | A1 | * | 6/2011 | Westerink | ............ B64D 11/064 |
| | | | | | 297/354.12 |

(Continued)

FOREIGN PATENT DOCUMENTS

| | | |
|---|---|---|
| EP | 1234530 A1 | 8/2002 |
| WO | 02066283 A1 | 8/2002 |
| WO | 2005066023 A2 | 7/2005 |

*Primary Examiner* — Timothy J Brindley
(74) *Attorney, Agent, or Firm* — Volpe Koenig

(57) ABSTRACT

A reclining seat comprises a fixed supporting frame, a reclining backrest, a sitting portion and a stiffening mechanism with reduced overall dimensions, which in turn comprises, at lower ends of frame elements forming the seat frame, a lever which is revolvingly hinged on a respective pin integral with the supporting frame and forming a rocker arm which rotates by a pre-fixed angle from a first position, corresponding to the reclining backrest in erected position, to a second position, corresponding to the reclining backrest in reclined position, a stiff tie-rod being provided the ends thereof are joined to the respective distal ends of the rocker arms, thereby the rotation of one of them causes the rotation by an angle having the same width of the other rocker arm.

10 Claims, 5 Drawing Sheets

(56)  References Cited

U.S. PATENT DOCUMENTS

2013/0038103 A1*   2/2013  Scott .................... B60N 2/3025
                                                        297/248
2016/0297533 A1    10/2016  Le et al.
2020/0307419 A1*  10/2020  Finlay ................. B64D 11/064
2021/0179274 A1*   6/2021  Lueck ............... B64D 11/0696
2021/0316865 A1*  10/2021  Lasell ................. B64D 11/064

* cited by examiner

RECLINING SEAT

FIELD OF THE INVENTION

The present invention relates to a seat provided with a reclining backrest, mentioned in short as reclining seat, in particular of the type adapted to be formed on a fastening structure connecting it stably to the floor, and which can be arranged on parallel rows of seats adjacent therebetween, for example on board vehicles such as aircrafts, trains or vehicles on the road, which are all connected to the same fastening structure; the reclining seat, apart from the backrest, has also a fixed supporting frame, which partially consists of said fastening structure, and a sitting portion, which can be in contact with a lower end of the backrest, and the sliding thereof could be arranged or it could be fixed.

CONTEXT OF THE INVENTION

As it is known, especially in the aeronautical field, the seats reserved for passengers must meet, on one side, strict safety standards and, on the other side, the needs requiring a reduced weight but, in any case, they must provide even a certain level of performances, in particular in terms of comfort.

The reclining seats, the present invention relates to, include a backrest consisting of a backrest frame having a substantially parallelepiped shape and which is formed by bar elements which define the side profile and the headrest thereof, and which are joined to the fixed supporting frame in order to be able to be reclined and brought back in erected position. On the backrest frame a padded coating of flexible type is then mounted.

The backrest frame comprises vertical bar elements, in particular arranged at the side edge of the backrest, and each one thereof has a joint revolvingly connecting it to the fixed supporting frame, in order to be able to swing when the seat is tilted.

In order to recline the backrest, the user generally acts by sitting on the sitting portion and by resting the back to the backrest itself, by exerting a pressure thereon.

At the same time, he/she presses a button which deactivates a device locking the backrest, and exerts with his/her back a force backwards which opposes to an elastic force which tends to bring the backrest back in an erected position.

Then, one understands that, if greater pressures were exerted at or near a side edge with respect to the other one, or however asymmetrically, the backrest could twist, since the two vertical bar elements are stressed by forces different therebetween.

Moreover, in particular, if the sitting portion was of the sliding type, to guarantee more space between seats of a row with respect to those of another row arranged frontally, the backrest has to be configured in an erected position, as well as in determined flight phases, and in case even the sitting portion has to be translated in rear direction, since it is hinged to the backrest at a lower end thereof, that is at the lower ends of the vertical bar elements.

Therefore, the reclining backrest is often tilted in one direction or in another one by its user.

However, the force exerted by the user body on the sitting portion could not always be symmetrical, and this can involve a backrest torsion.

This torsion, on one side, would tend to lock the rotation of the joints between backrest and frame and, on the other side, would involve an unwished wear of the reclining seat, and in any case the passenger would perceive less comfort.

International patent application No. WO 02/066,283 A1 describes an aeronautical seat with reclining backrest, provided with a stiffening mechanism comprising an actuator arranged below the sitting portion, and acting on the frame ends of the backrest; but such mechanism has an overall dimension and weight which could result to be excessive in the transport field.

SUMMARY OF THE INVENTION

The technical problem underlying the present invention is to provide a reclining seat allowing to obviate the drawback mentioned with reference to the known art.

Such problem is solved by a seat as specified in the preamble, further comprising a stiffening mechanism which is integral with the fixed supporting frame and which provides, at each lower end of the vertical frame elements of the backrest, a lever, which is joined to a respective lower end and which forms a rocker arm thanks to a pin, thereon it is revolvingly mounted, integral with the fixed frame of the seat, so that each rocker arm rotates by an angle having a prefixed width, from a first position, corresponding to the reclining backrest in erected position, to a second position corresponding to the reclining backrest in reclined position.

The stiffening mechanism then comprises a stiff tie-rod, the tie-rod ends thereof are joined to the respective distal ends of the rocker arms, thereby the rotation of one of them causes the rotation of the other rocker arm by an angle having the same width.

This connection makes that the frame lower ends of the above-mentioned vertical bar elements always move synchronously, even if the backrest is stressed asymmetrically, since the above-described mechanism determines a mutual dragging of the two ends, by preventing the backrest frame from being subjected to a torsion.

The main advantage of the seat according to the present invention lies in the fact of preventing effectively the torsion of the seat frame, when the seat itself is stressed in disordered and asymmetrical way by the passenger.

BRIEF DESCRIPTION OF THE DRAWINGS

The present invention will be described hereinafter according to a preferred embodiment example, provided by way of example and not with limiting purposes, of a reclining seat of aeronautical type and with reference to the enclosed drawings wherein.

DESCRIPTION OF PREFERRED EMBODIMENT EXAMPLES OF THE INVENTION

Figure 1:
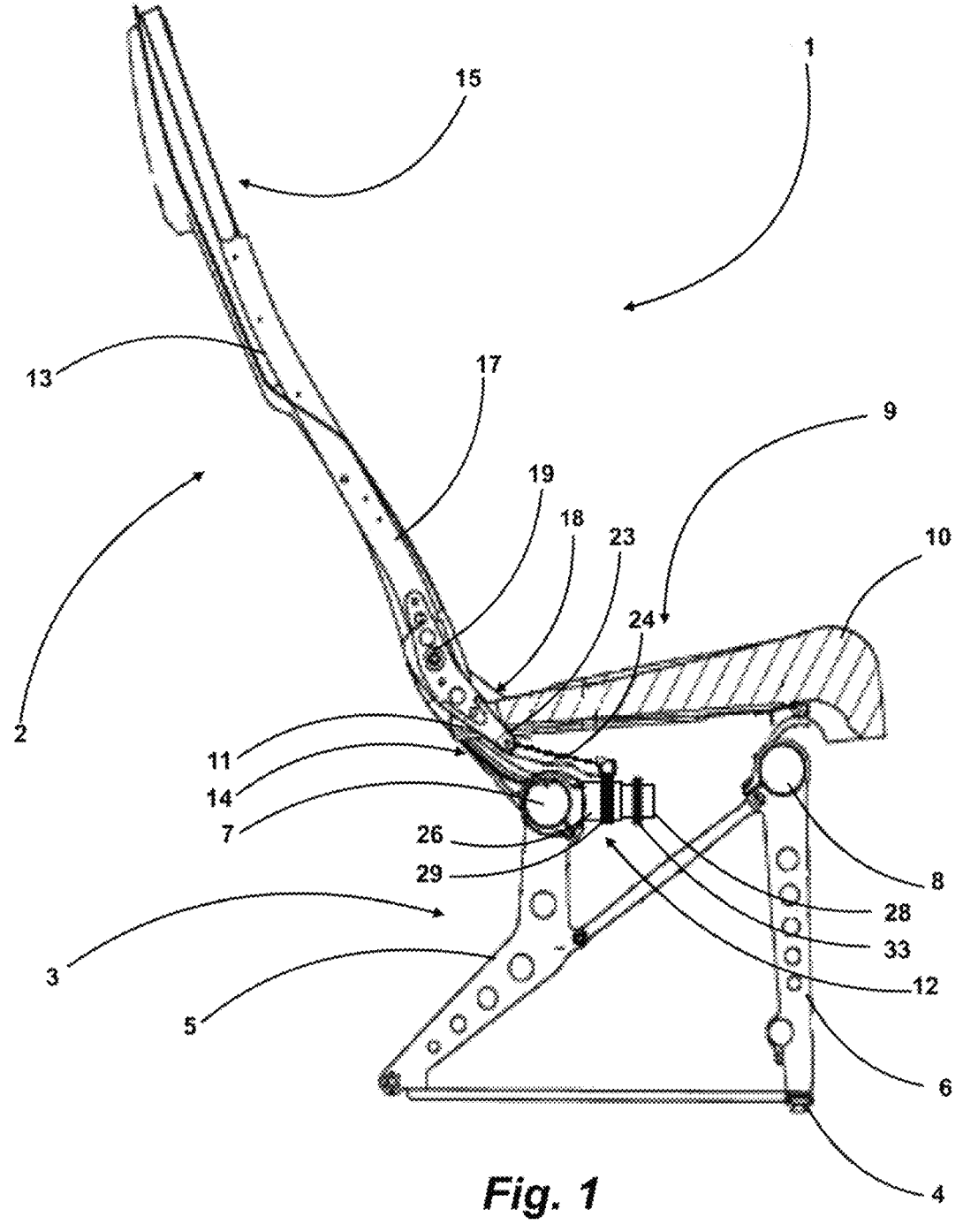
FIG. 1 shows a section view of a reclining seat according to a first embodiment example of the present invention, in a respective row of seats.

With reference to FIG. 1, a row of the reclining seats is shown in cross section, by highlighting a reclining seat of a first example of the present invention, designated as a whole with 1. The row can include a variable number of reclining seats, or can consist of one single seat; the seats composing the row can be reclined independently from one another. Such row is arranged to be positioned in a series of subsequent rows, parallel to each other, each one forming a space, between itself and the row positioned frontally, which is used by the users to access the seats 1 and to raise therefrom.

This type of seat in particular is an aeronautical seat, installed on board aircrafts, but it is meant that the invention generally relates to any type of seat which can be installed on board any vehicle, such as trains or buses, or even in other contexts, such as stadiums, cinema halls, conference halls and so on.

Each reclining seat 1 comprises a reclining backrest 2 and a fixed supporting frame which, in the present example, is constrained to the aircraft floor.

In particular, the fixed supporting frame of each reclining seat 1 consists of a fastening structure 3 which is provided to connect all seats of a row to specific anchoring means 4 implemented in the aircraft's floor according to suitable safety standards. The fastening structure comprises rear uprights 5 and front uprights 6, which have respective upper ends which are connected respectively by a first rear cross bar 7 and by second front cross bar 8, both of them supported at a certain distance from the ground, to provide a supporting base to the reclining seat.

The two cross bars 7, 8 are tubular, that is they are implemented by stiff tubular elements extending horizontally by anchoring all seats of the row at a prefixed height. In particular, the tubular elements have a cylindrical and smooth external surface.

At each seat 1, the fastening structure 3 then comprises a pair of stiff connecting elements 20 which extend between the two cross bars 7, 8, by connecting them stiffly, and by delimiting a space in which the reclining seat 1 is contained.

In particular, the connecting elements 20 comprise respective frame stiff extensions 21 extending in substantially vertical, or slightly tilted, direction from the first cross bar 7, by delimiting a space wherein the reclining backrest 2 of each seat is comprised.

The connecting elements 20, with the frame stiff extensions 21, and the cross-bar portions 7 and 8 comprised therebetween substantially constitute the fixed supporting frame of each reclining seat 1.

Moreover, the reclining seat 1 comprises a sitting portion 9 resting on said cross bars; it has a front sitting edge 10 and a rear sitting end 11.

The reclining backrest 2 has a backrest frame 13 having a substantially parallelepiped-like shape extending from a backrest lower end 14, arranged below the sitting portion 9, and a headrest 15, such shape being defined by the backrest frame 13 whereon a coating 16 is mounted.

The backrest frame 13 in particular comprises two vertical frame elements 17, which are arranged each one at a respective side edge of the backrest 2, extending from said backrest lower end 14 to a junction element implementing said headrest 15.

The two frame elements 17 are stiff and they have a slightly bent shape to form a resting intrados for a user's back. Each frame element 17 has a first joint 19, arranged near the backrest lower end 14, revolvingly connecting the backrest 2 to the respective frame stiff extensions 21, that is to the supporting frame formed in the fastening structure 3.

The frame elements 17 further comprise respective lower ends 22, which result to be positioned below the sitting portion and which are movable from a first prefixed position, corresponding to the backrest 2 in erected position, to a second prefixed position, corresponding to the backrest 2 in position reclined by the maximum angle allowed by the geometry of the reclining mechanism which is not herein described, but which can be of any type and allows possible intermediate positions between the two above-mentioned ones.

Below the sitting portion 9, the reclining seat 1 comprises a respective stiffening mechanism, designated as a whole with 12, to stiffen the reclining backrest 2, which is associated to the supporting frame of the seat 1, that is to the fastening structure 3, and in particular to the first cross bar 7.

The stiffening mechanism 12 acts on the lower ends 22 of each one of the frame elements 17, which comprise a respective second joint 23 connected to a corresponding control arm 24.

The stiffening mechanism 12 comprises respective first collars 25 fastened in a prefixed position to the first bar 7, near a respective lower end 22; each first collar comprises a respective fixed arm 26, extending horizontally an arm in direction of the second opposite bar 8.

Hereinafter, what has been described with reference to one of said two lower ends 22 can also be described for the other one, the portions being referred to one of the two ends functionally specular to those referred to the other end.

Therefore, the stiffening mechanism 12 comprises a lever 27 which is joined to said frame lower end 22 through said control arm 24, and which is revolvingly hinged with respect to the fixed supporting frame at a first pin 29 implementing a respective joint which, in this example, is arranged at the projecting end 30 of the above-mentioned fixed arm 26, so that such joint is at a prefixed distance from the first bar 7 of the frame.

The lever 27 forms a rocker arm 28 extending from said pin 29, the lever 27 and the rocker arm 28 being stiffly integral with one another and thus forming a stiff connection, in particular being implemented in one single piece.

The first pin 29 thus implements a respective hinge defining a respective rotation axis A which crosses, with its projections, the space comprised between the two cross bars 7, 8, and it is arranged at a certain distance, imposed by the arm 26, from the first rear cross bar 7.

In this respect, the lever 27 has a first distal end revolvingly connected to said second joint 23 of the control arm 24, thus implementing a kinematic connection joined between frame element 17 of the backrest 2 and the stiffening mechanism 12.

Because of this mechanism, the rocker arm 28 rotates by a prefixed angle from a first position, corresponding to the reclining backrest 2 in erected position, to a second position, corresponding to the reclining backrest 2 in reclined position.

This rotation has a prefixed rotation axis, the width thereof is determined by the translation of the control arms 24, that is by the excursion of the lower ends 22 when the backrest is moved from an erected position to a reclined position, positions which will be determined by suitable stops.

It will be noted that the excursion in particular of the rocker arm 28 could be wider than the limited excursion of the lower end 22, since such end is at a reduced distance from the joint 19 of the backrest frame 13, and since the angular excursion of the reclining backrest 2 itself will be however reduced.

Each rocker arm 28 have a respective second distal end 32 comprising a second pin 33 of hinge, still with substantially vertical axis designated with B (FIG. 2), that is parallel to the one defined by the first pin 29.

Each second pin 33 is revolvingly connected to the end of a stiff tie-rod 34 connecting each rocker arm 28 to the other one, implemented by a stiff rod with a predetermined length so that the tie-rod 34 makes that the second distal ends 32 of the rocker arms 28 are always at the same distance.

Thanks to this mechanism, the rotation of one lever 27 and of the respective rocker arm 28 causes a rotation of the other lever 27 and of the other respective rocker arm 28, and vice versa, by an angle having the same width, and in this way the frame elements 17 of the backrest frame 13 move always synchronously, without determining any torsion in the backrest frame 13.

Figure 2:
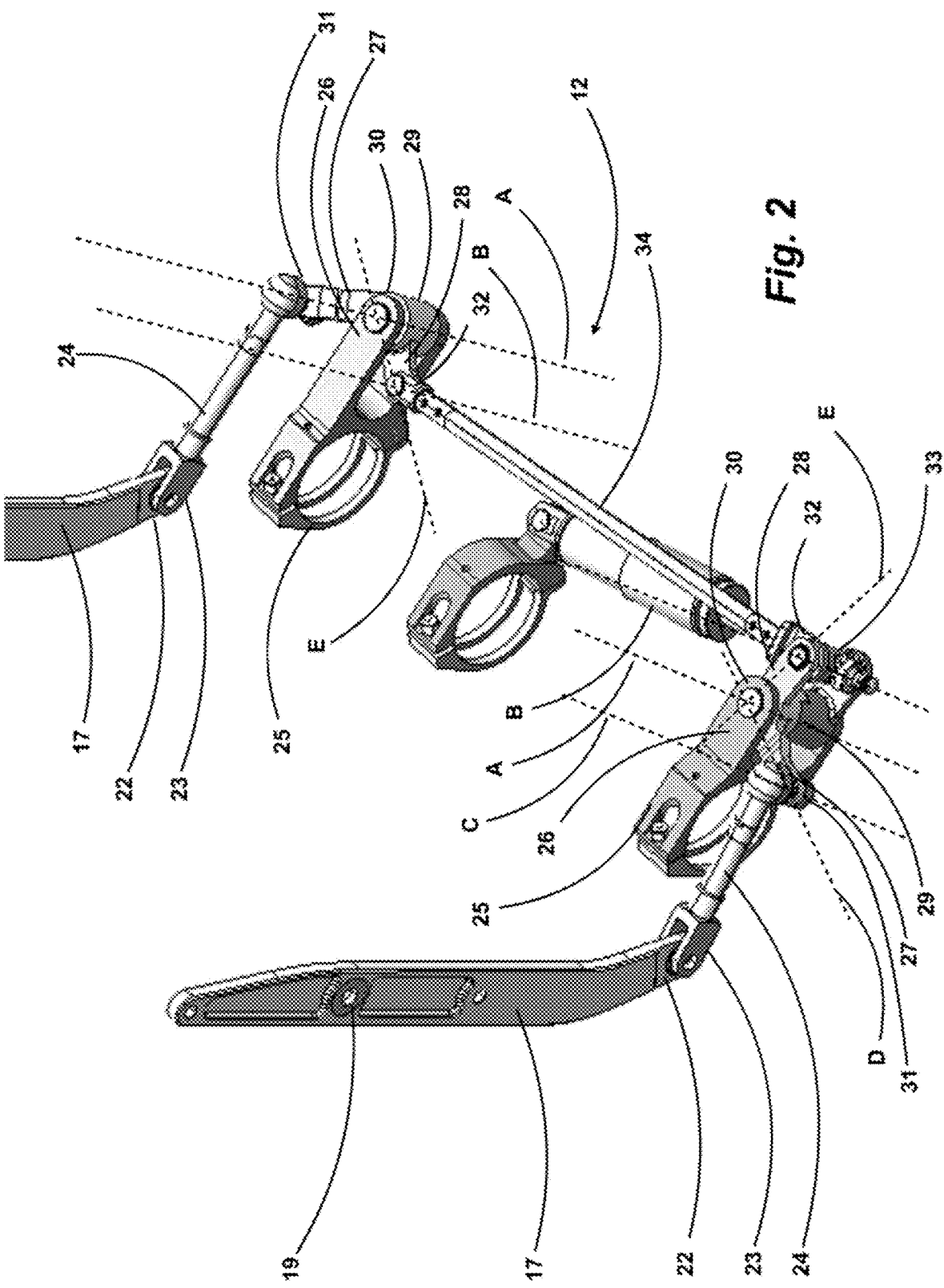
FIG. 2 shows an enlarged perspective view of a detail of the seat of FIG. 1.

With reference to FIG. 2, it will be noted that the first rotation axis A, determined by the first pin 29, the second rotation axis B, determined by the second pin 33, and a third rotation axis C determined by the hinge connection between control arm 24 and lever 27, are all parallel therebetween, and substantially vertical, whereas the first lever axes D identified by the levers 27 and the second lever axes E identified by the rocker arms 28 form equal angles therebetween, but facing opposite directions, and they move on a common plane, which is perpendicular to the rotation axes A, B, C.

In this example of stiffening mechanism 12, the first pins 29 will be positioned thereby they will rotate one in counterclockwise direction and the other one in clockwise direction, and vice versa.

Figure 3:
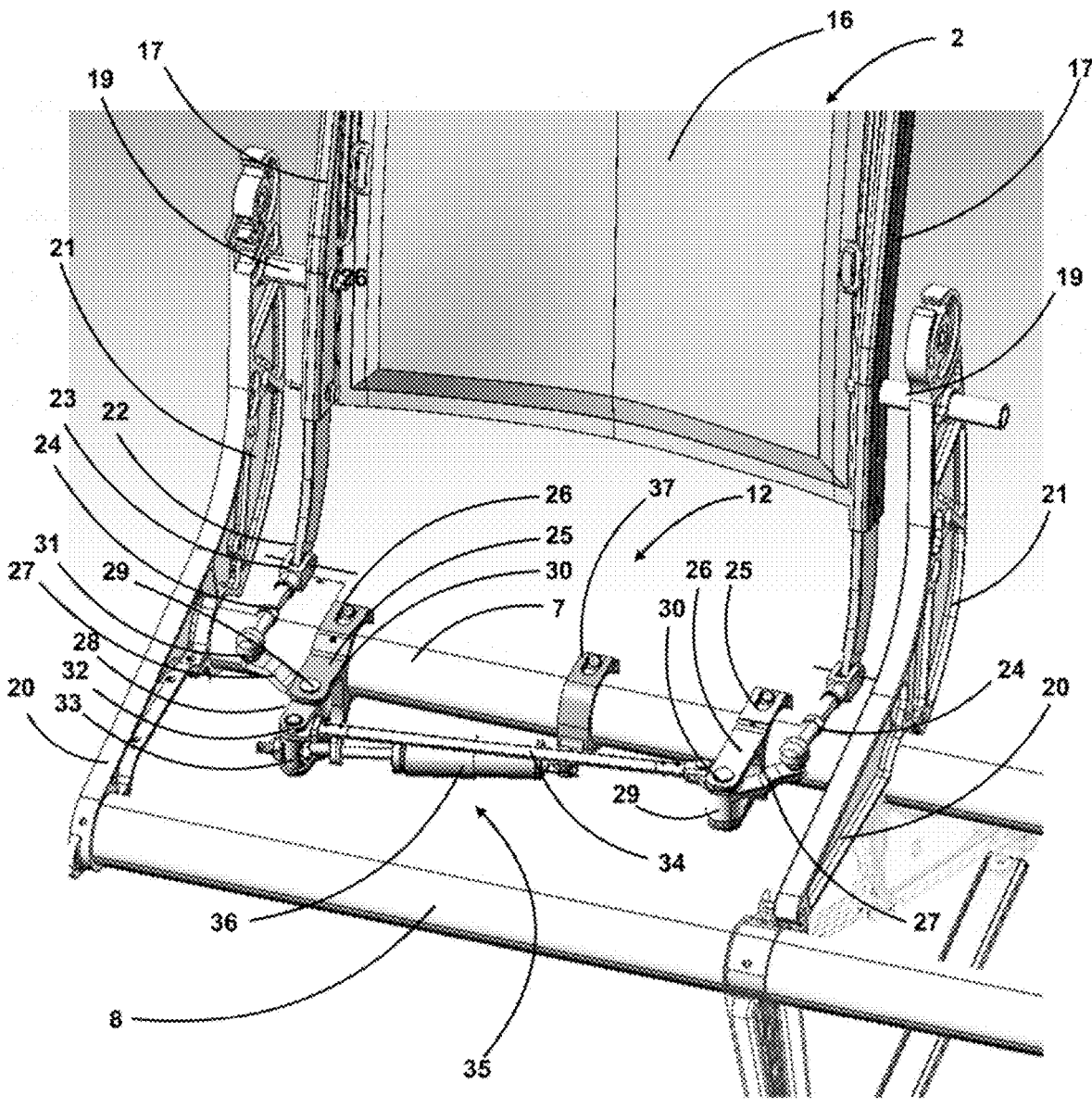
FIG. 3 shows a front and partial perspective view of a seat of FIG. 1, in cross section.

With reference to FIGS. 2 and 3, the stiffening mechanism 12 comprises a damping device 35, performing the function of adjusting and slowing down the shifting of the seat 2 from a configuration to the other one.

This device 35 comprises a hydraulic cylinder 36, acting as damper, which is conveniently connected to one of the levers 27, in particular to its rocker arm 28, whereas the other one has to be associated to a fixed portion of the supporting frame.

It is meant that more than one damper can be provided, connected to levers which rotate by accompanying the motion of the frame lower ends 22 of the backrest 2.

In this example, the other end of the hydraulic cylinder 36 is connected to a second collar 37, independent from the collars 25 and generally from the stiffening mechanism 12, fastened to the first bar 7, acting as tightening ring, and which can be positioned in any point of the fixed supporting frame along the first bar 7, or in case even to the other one, to adapt its position to the features of the hydraulic cylinder 36, by anchoring it fixedly, but even removably.

The tightening ring-like structure, acting on the tubular periphery of one of the cross bars 7, 8, can relate even to the above-described first collars 25.

The arrangement in which all tightening rings are anchored to the rear cross bar 7 allows to empty the space below the sitting portion 9, since both the stiffening mechanism 12 and the damping device 35 are associated on the rear side of the space below the sitting portion 9, by making it more accessible to arrange luggage and accessories, thus reducing the overall space engaged by the stiffening mechanism 12.

Figure 4:
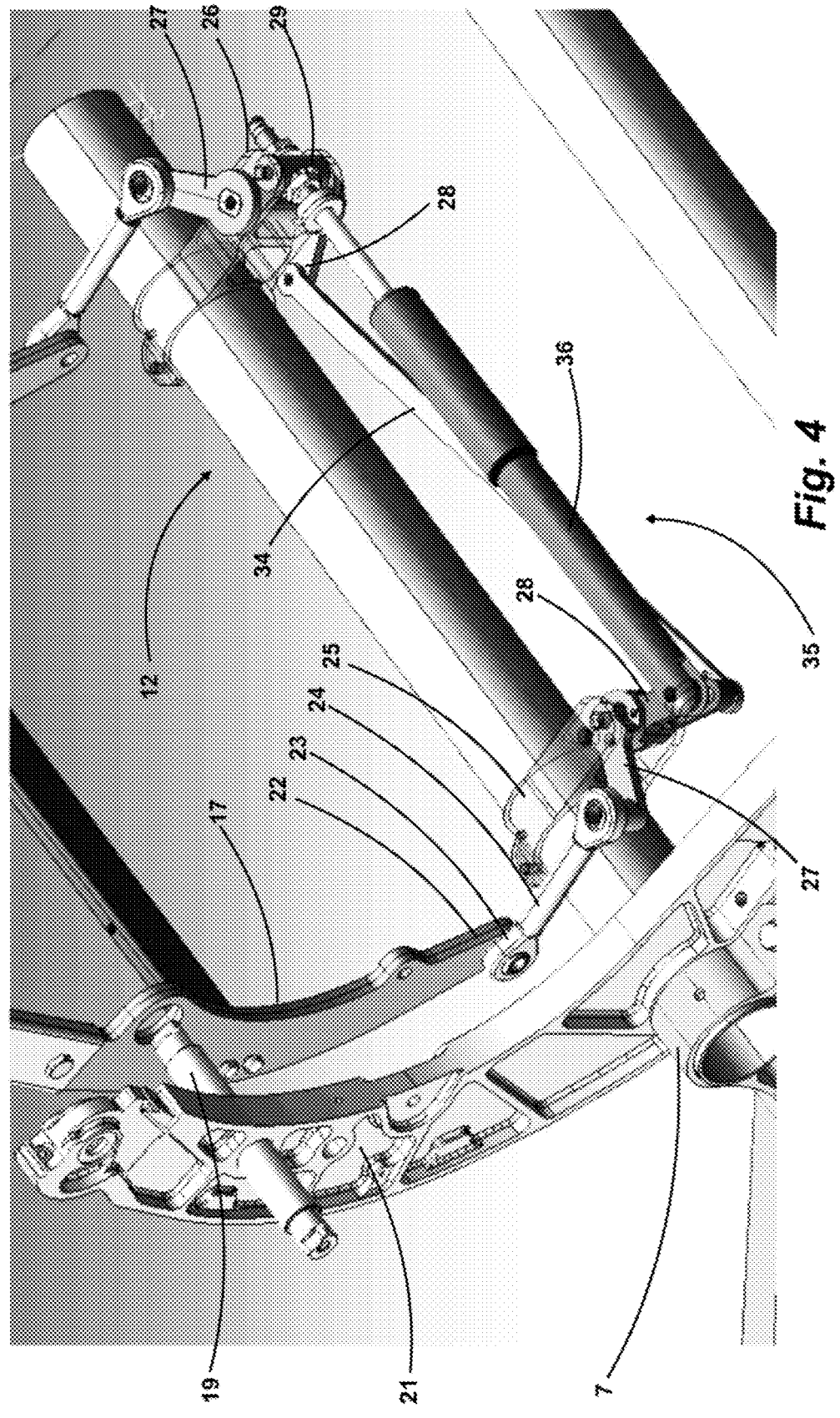
FIG. 4 shows a front and partial perspective view of a seat of a second embodiment example of the present invention, in cross section.

With reference to FIG. 4, in a second embodiment example of the present seat, the two frame elements 17 have a cross connection bar 38 connecting them stiffly near the frame lower ends 22. This connection can attenuate the torsion thereto the backrest frame 13 could be subjected, thus reducing the load on the tie-rod 34, however it does not remove it.

Moreover, in the damping device 35, which for the rest is equal to the one described previously, the hydraulic cylinder 36 of the damping device 35, instead of being connected to the second collar 37, is always connected to a section of the first cross bar 7, at a distance from the frame lower end 22 whereon it acts so as to allow to insert the hydraulic cylinder 36.

In this way, the hydraulic cylinder 36, which in this example is mounted upside down with respect to the preceding example, can have a larger extension.

Figure 5:
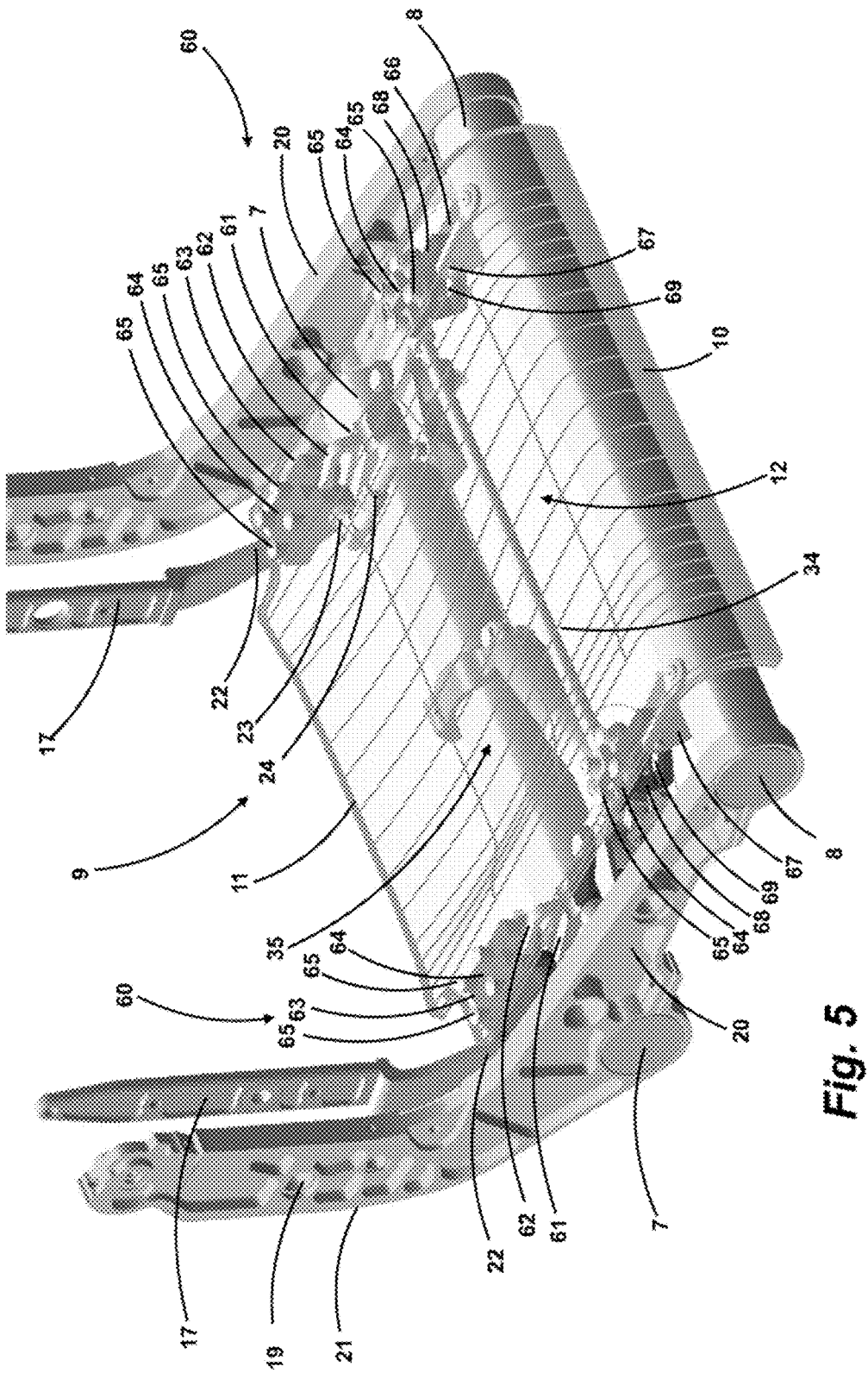
FIG. 5 shows a partially transparent perspective view, showing a third embodiment example of the reclining seat according to the invention, provided with sliding sitting portion.

With reference to FIG. 5, a third example of reclining seat 1 comprises both the stiffening mechanism 12 and the damping device 35 as they have been described with reference to FIGS. 2 and 3, wherein the sitting portion 9 is fixed and does not participate in the swinging motion of the reclining backrest 2.

In the third example, the seat 1, below the sitting portion, comprises a sliding system 60 of the sitting portion 9 which, as it will result clearly hereinafter, is integral with the fixed supporting frame of the reclining seat 1; it comprises, at both two control levers 24, respective first supporting slides 61 fastened in a prefixed position on the rear cross bar 7. On each first supporting slide 61 a first, raised, rectilinear guide 62 is formed of the type with a through groove adapted to be engaged by a sliding pin.

The first supporting slide 61 could be formed on the above-described first collar 25, or it could be connected directly on the first cross bar 7.

On each first supporting slide 61 there is a first shoe 63 which is integral with the second joint 23 and with the control lever 24; it has a respective upper face 64 which is provided with a plurality of fastening projections 65, inserted in corresponding recesses formed on the surface of the sitting portion 9 which is rested upon such upper face, so as to create a stable connection.

The first shoes 63 are integral with the respective control levers 24 and second joints 23, and each one has inside thereof a sliding pin inserted in said through groove.

On the second front cross bar 8, in a position which substantially corresponds to the one of the first supporting slides 61, the sliding system 60 provides respective second supporting slides 66 fastened in a prefixed position on the front cross bar 8, and arranged however so as to project in the space between the two cross bars 7, 8. On each second supporting slide 66 a raised wall 67 is formed, formed vertically on one side of the second supporting slide 66, therefrom a sliding pin projects.

The second supporting slide 66 could be connected directly on the second cross bar 8 by means of a fastening screw.

On each second supporting slide 66 there is a second shoe 68 having, like the first shoe 63, a respective upper face 64 which is provided with a plurality of fastening projections 65, inserted in corresponding recesses formed on the surface of the sitting portion 9 which is rested upon such upper face, so as to create a stable connection.

The second shoe 68 further has its own second, raised, rectilinear guide 69 of the type with a through groove adapted to be engaged by the sliding pin of the second supporting slide 66.

The first and second guides 62, 69 are parallel therebetween, and determine a prefixed course of the sitting portion 9 which, since it is fastened to said shoes 63, 68, can move back and forth for a limited excursion corresponding to the angular excursion of the backrest lower end 14 when the backrest 2 is reclined and is brought back in erected position.

In this third example, the rear sitting end 11 of the sitting portion 9 and revolvingly connected to the reclining backrest 2 near the backrest lower end 14, that is below the first joint 19, at a contact point between backrest 2 and sitting portion 9 designated with 18 in FIG. 1.

Thanks to such connection, when the backrest 2 is reclined, its lower end 14 moves forwards and thus the sitting portion 9 and its sitting end 10, whereas, when the backrest 2 is brought back in an erected position, the sitting portion 9 and its sitting end 10 move back.

In the present example, even this motion is dampened by the damping device 35.

It is meant that, in this example of seat 1, the passenger could recline the backrest 2 by exerting a pressure also or only on the sitting portion 9, which could not be symmetrical and cause potentially a torsion onto the backrest as well as a rotation of the sitting portion 9. However, these motions are prevented by the stiffening mechanism 12 acting also on the sitting portion, and by the fact that the sitting portion moves on rectilinear guides.

In the above-described examples, the hydraulic cylinder 36 could be of the elastic return type; in particular it could include inside thereof a spring arranged to make the hydraulic cylinder 36, in absence of stresses onto the backrest, to go back from an extended configuration, corresponding to the reclined seat, to a retracted configuration, corresponding to the seat in erected position, or vice versa.

Otherwise, the elastic return of the seat in erected position, when it is released in absence of other stresses, by other elastic elements, in particular acting on the joints 19 of the backrest frame 13.

Another solution may provide that a return elastic element is inserted in the pin(s) 29 of the vertical-axis hinge associated to the damping device 35.

To the above-described reclining seat a person skilled in the art, with the purpose of satisfying additional and contingent needs, could introduce several additional modifications and variants, all however comprised within the protective scope of the present invention, as defined by the enclosed claims.

The invention claimed is:

1. A reclining seat comprising:
 a fixed supporting frame;
 a sitting portion;
 a reclining backrest having a backrest frame with two vertical frame elements, arranged each one at a respective side edge of the reclining backrest, and each one thereof is provided with a joint, revolvingly connecting it to the fixed supporting frame, and a lower end movable between positions depending upon the erected or reclined state of the backrest;
 a stiffening mechanism comprising, at each lower end, a respective lever hinged thereto, which is revolvingly hinged, with respect to the fixed supporting frame, around a pin forming a respective hinge integral with the fixed supporting frame, said respective lever implementing a rocker arm, projecting from said respective hinge, the lever and the rocker arm being integral with each other, and the rocker arm rotating by a pre-fixed angle from a first position, corresponding to the reclining backrest in erected position, to a second position, corresponding to the reclining backrest in reclined position,
 wherein each rocker arm has a respective distal end, a stiff tie-rod being provided joined to the respective distal ends of the rocker arms, thereby the rotation of one of the rocker arms causes the rotation by an angle having the same width of the other rocker arm.

2. The reclining seat according to claim 1, wherein the supporting frame comprises a first rear cross tubular bar and a second front cross tubular bar, said stiffening mechanism being associated to said first rear cross bar by means of collars which are fastened to said rear tubular bar in respective prefixed positions, near a corresponding lower end.

3. The reclining seat according to claim 2, wherein the stiffening mechanism comprises a respective stiff arm, extending from each collar in direction of said second tubular bar, which has a distal end whereon said pin is formed, which is arranged at a prefixed distance from said first tubular bar.

4. The reclining seat according to claim 2, wherein said collar is a tightening ring, positionable along said first tubular bar in a prefixed position.

5. The reclining seat according to claim 1, wherein the stiffening mechanism comprises an actuation arm revolvingly connecting each lower end to the respective lever.

6. The reclining seat according to claim 1, wherein the stiffening mechanism comprises a damping device, with a hydraulic cylinder, having respective opposite ends, one thereof is joined to the fixed supporting frame and the other one is joined to one of the levers or to one of the respective rocker arms.

7. The reclining seat according to claim 6, wherein one end of the damper is connected to the fixed supporting frame at a rear cross tubular bar thereof by means of a respective tightening ring positionable thereon.

8. The reclining seat according to claim 1, wherein said sitting portion slides on a sliding system which is arranged therebelow and which is connected to the fixed supporting frame of the reclining seat.

9. The reclining seat according to claim 8 wherein the sliding system comprises supporting slides integral with the fixed supporting frame, thereon respective shoes are mounted sliding on a rectilinear guide, thereon said sitting portion is mounted.

10. The reclining seat according to claim 1, wherein the reclining seat is an aeronautical seat.

* * * * *